H. WHORWELL.
SPINDLE STEP LUBRICATOR.
No. 175,802. Patented April 4, 1876.
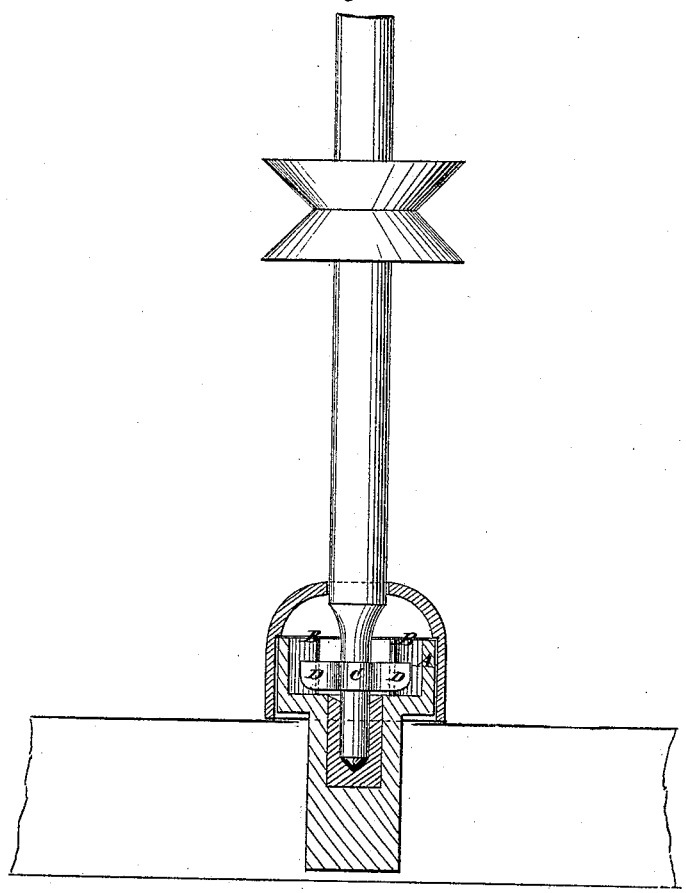
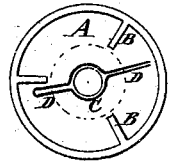
WITNESSES:
A. W. Almquist
John Goethals
INVENTOR:
H. Whorwell
BY
Munn
ATTORNEYS.

UNITED STATES PATENT OFFICE.

HENRY WHORWELL, OF PATERSON, NEW JERSEY.

IMPROVEMENT IN SPINDLE-STEP LUBRICATORS.

Specification forming part of Letters Patent No. 175,802, dated April 4, 1876; application filed March 21, 1876.

*To all whom it may concern:*

Be it known that I, HENRY WHORWELL, of Paterson, Passaic county, New Jersey, have invented a new and Improved Spindle-Step, of which the following is a specification:

My invention consists of a collar on the spindle in the oil-cup, with projecting arms and flanges on the wall of the cup, to prevent the collar from turning with the spindle, the object of the collar being to prevent the oil from being forced around rapidly by the spindle, which causes it to overflow and waste.

Figure 1 is a sectional elevation of a spindle-step constructed according to my invention. Fig. 2 is a top view, and Fig. 3 is a perspective view, of a collar of modified form that may be used.

Similar letters of reference indicate corresponding parts.

A is the cup, having one or more flanges, B, on the inner wall or bottom, and C is the collar, with one or more projections, D, fitted on the spindle loosely, so that the spindle will turn without friction in it, and the collar is prevented from turning by the flanges, to prevent the oil from being set in rapid motion, so as to overflow and waste.

Having thus described my invention, I claim as new and desire to secure by Letters Patent—

A collar, C, with one or more projections, D, in combination with one or more flanges, B, in the oil-cup, substantially as specified.

HENRY WHORWELL.

Witnesses:
EDWD. R. FEGAN,
THOMAS PERRY.